US011092867B2

(12) United States Patent
Kloeppner et al.

(10) Patent No.: US 11,092,867 B2
(45) Date of Patent: Aug. 17, 2021

(54) POLARIZED ELECTROCHROMIC DEVICE

(71) Applicant: Gentex Corporation, Zeeland, MI (US)

(72) Inventors: Leroy J. Kloeppner, Jenison, MI (US); Henry A. Luten, Holland, MI (US); William L. Tonar, Holland, MI (US); Zachary B. Erno, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 188 days.

(21) Appl. No.: 16/235,799

(22) Filed: Dec. 28, 2018

(65) Prior Publication Data

US 2019/0204702 A1    Jul. 4, 2019

Related U.S. Application Data

(60) Provisional application No. 62/611,816, filed on Dec. 29, 2017.

(51) Int. Cl.
*G02F 1/157* (2006.01)
*G02F 1/1516* (2019.01)
*B60R 1/08* (2006.01)
*G02B 5/30* (2006.01)

(52) U.S. Cl.
CPC .............. *G02F 1/157* (2013.01); *B60R 1/088* (2013.01); *G02B 5/3058* (2013.01); *G02F 1/15165* (2019.01); *G02F 2203/02* (2013.01)

(58) Field of Classification Search
CPC ..... B60R 1/088; G02F 1/157; G02F 1/15165; G02F 2203/02; G02B 5/3058
See application file for complete search history.

(56) References Cited

U.S. PATENT DOCUMENTS

| 5,928,572 | A  | 7/1999  | Tonar et al. |
| 5,998,617 | A  | 12/1999 | Srinivasa et al. |
| 6,020,987 | A  | 2/2000  | Baumann et al. |
| 6,037,471 | A  | 3/2000  | Srinivasa et al. |
| 6,137,620 | A  | 10/2000 | Guarr et al. |
| 6,141,137 | A  | 10/2000 | Byker et al. |
| 6,193,912 | B1 | 2/2001  | Thieste et al. |

(Continued)

FOREIGN PATENT DOCUMENTS

| JP | 57093325 A    | * | 6/1982 |
| WO | 9842796 A1    |   | 10/1998 |
| WO | 9902621 A1    |   | 1/1999 |
| WO | 2011068852 A1 |   | 6/2011 |

OTHER PUBLICATIONS

Roger J. Mortimer, David R. Rosselinsky, and Paul M.S. Monk, Electrochromic Materials and Devices, 2015, 9 pages, Willey-VCH Verlag GmbH & Co, KGaA, Weinheim, Germany.

(Continued)

*Primary Examiner* — Tuyen Tra
(74) *Attorney, Agent, or Firm* — Price Heneveld LLP; Bradley D. Johnson

(57) ABSTRACT

An optical assembly is provided that includes an electro-optic element that is configured to transition between a substantially clear state and a substantially darkened state. The electro-optic element can include an electrochromic polymer or network film that is substantially aligned with light having a predetermined polarization such that the electro-optic element is variably transmissive to the polarized light.

10 Claims, 11 Drawing Sheets

(56) References Cited

U.S. PATENT DOCUMENTS

| | | | |
|---|---|---|---|
| 6,241,916 B1 | 6/2001 | Claussen et al. | |
| 6,245,262 B1 | 6/2001 | Varaprasad et al. | |
| 6,249,369 B1 | 6/2001 | Theiste et al. | |
| 6,268,950 B1 | 7/2001 | Ash et al. | |
| 6,519,072 B2 | 2/2003 | Nishikitani et al. | |
| 7,001,540 B2 | 2/2006 | Kloeppner et al. | |
| 8,282,253 B2 | 10/2012 | Lynam | |
| 2010/0277786 A1* | 11/2010 | Anderson | G02F 1/0136 359/247 |
| 2015/0378233 A1* | 12/2015 | Fujimura | G02F 1/1525 359/266 |

OTHER PUBLICATIONS

Richard J. Bushby, Stephen M. Kelly, and Mary O'Neill (Editors), Liquid Crystalline Semiconductors, Materials, Properties ad Applications, Springer Series in Materials Science 169, 2013, 15 pages, Published by Springer, The Netherlands.

Elda Hegmann, The 2017 International Liquid Crystal Elastomers Conference (2017 ILEC), Liquid Crystals Today, 2018, vol. 27, No. 2, 25-27, Taylor & Francis Group, United Kingdom, https://doi.org/10.1080/1358314X.2018.1479159.

Koen Binnemans, Ionic Liquid Crystals, Chemical Reviews, Nov. 9, 2005, 2 pages, vol. 105, No. 11.

Danqing Liu, and Dirk J. Broer, Liquid Crystal Polymer Networks: Preparation, Properties, and Applications of Films with Patterned Molecular Alignment, Langmuir 2014, 30 13499-13509, ACS Publications.

Daichi Yamaoka, Mitsuo Hara, Shusaku Nagano, and Takahiro Seki, Photoalignable Radical Initiator for Anisotropic Polymerization in Liquid Crystalline Media, Macromolecules, 2015, 48, 908-914, ACS Publications.

Martin Schadt, Hubert Seiberle, Andreas Schuster and Stephen M. Kelly, Photo-Generation of Linearly Polymerized Liquid Crystal Aligning Layers Comprising Novel, Integrated Optically patterned Retarders and Color Filters, Jpn. J. Appl. Phys. vol. 34 (1995), pp. 3240-3249, Part 1, No. 6A, Jun. 1995.

* cited by examiner

I

II

III

IV

V

VI

VII

VIII

IX

POLARIZED ELECTROCHROMIC DEVICE

CROSS-REFERENCE TO RELATED APPLICATION

This application claims priority to and the benefit under 35 U.S.C. § 119(e) of U.S. Provisional Application No. 62/611,816, filed on Dec. 29, 2017, entitled "POLARIZED ELECTROCHROMIC DEVICE," the disclosure of which is hereby incorporated herein by reference in its entirety.

FIELD

The present disclosure generally relates to an electro-optic element, and more particularly, an electro-optic element whose absorption or reflectance is polarized or exhibits dichroism.

SUMMARY OF THE DISCLOSURE

According to one aspect of the present disclosure, an electro-optic element is provided that includes a first substantially transparent substrate defining first and second surfaces. The second surface includes a first electrically conductive layer. A second substantially transparent substrate defines third and fourth surfaces. The third surface includes a second electrically conductive layer. A primary seal is disposed between the first and second substrates. The seal and the first and second substrates define a cavity there between, and wherein an electrochromic polymer or network film is disposed within the cavity. The electrochromic polymer or network film is aligned with light of a predetermined polarization and is variably transmissive to the light of this predetermined polarization such that the electro-optic element is operable between a substantially clear state and a darkened state relative to the light of the predetermined polarization. The electro-optic element is configured to substantially absorb the light of the predetermined polarization when in the darkened state. In some aspects, the electro-optic element is configured to substantially absorb the light of the predetermined polarization when in the darkened state and to not substantially absorb light having a polarization different than the predetermined polarization.

According to another aspect of the present disclosure, an optical assembly is provided that includes a display configured to emit light of a first polarization and a reflective polarizer positioned adjacent to the display. The reflective polarizer can be configured to transmit the light of the first polarization and reflect light of a second polarization. An electro-optic element is positioned on the opposite side of the reflective polarizer from the display. The electro-optic element can be configured to transition between a substantially clear state and a substantially darkened state. The electro-optic element can include an electrochromic polymer or network film substantially aligned with the second polarization of the light such that the electro-optic element is configured to substantially absorb the light of the second polarization when in the darkened state while substantially transmitting light of the first polarization from the display.

According to yet another aspect of the present disclosure, a method of forming a polarized electro-optic element is provided that includes the steps of: aligning an electrochromic monomer and a liquid crystal component; polymerizing at least the electrochromic monomer to synthesize an electrochromic polymer or network film; positioning the electrochromic polymer or network film on a conductive layer of the electro-optic element; and adding an electrolyte to the electrochromic polymer or network film.

These and other features, advantages, and objects of the present disclosure will be further understood and appreciated by those skilled in the art by reference to the following specification, claims, and appended drawings.

BRIEF DESCRIPTION OF THE DRAWINGS

The present disclosure will become more fully understood from the detailed description and the accompanying drawings, wherein.

DETAILED DESCRIPTION

Figure 1:
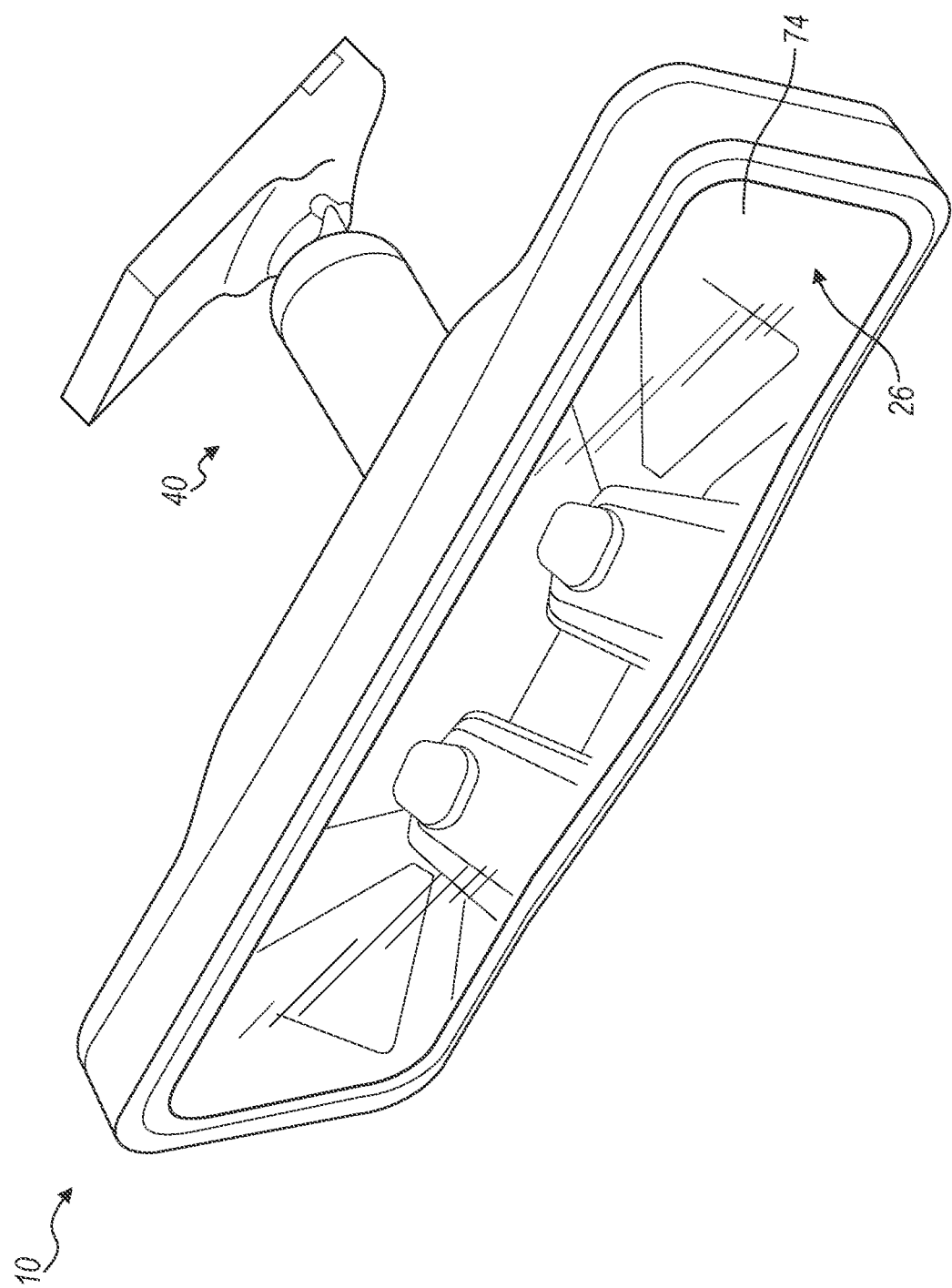
FIG. 1 is a top perspective view of a rearview mirror assembly, according to one aspect.

The present illustrated embodiments reside primarily in combinations of method steps and apparatus components related to an electro-optic element. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring now to FIGS. 1, 2, 9A and 9B, reference numeral 10 generally designates a vehicular rearview mirror assembly. The rearview mirror assembly 10 includes a display 14 which is configured to emit light 18 having a first polarization P1. A reflective polarizer 22 is positioned adjacent the display 14. The reflective polarizer 22 is configured to transmit the light 18 having the first polarization P1 and reflect the light 18 having a second polarization P2. An electro-optic element 26 is positioned on an opposite side of the reflective polarizer 22 than the display 14. The electro-optic element 26 is configured to transition between substantially clear and substantially darkened states. The electro-optic element 26 includes an electrochromic polymer or network film substantially aligned with the second polarization P2 of the light 18 such that the electro-optic element 26 is configured to absorb the light 18 having the second polarization P2 when in the substantially darkened state, while substantially passing light of the first polarization P1. In this manner, the electrochromic polymer or network film is variably transmissive to light of the second polarization P2.

Figure 2:
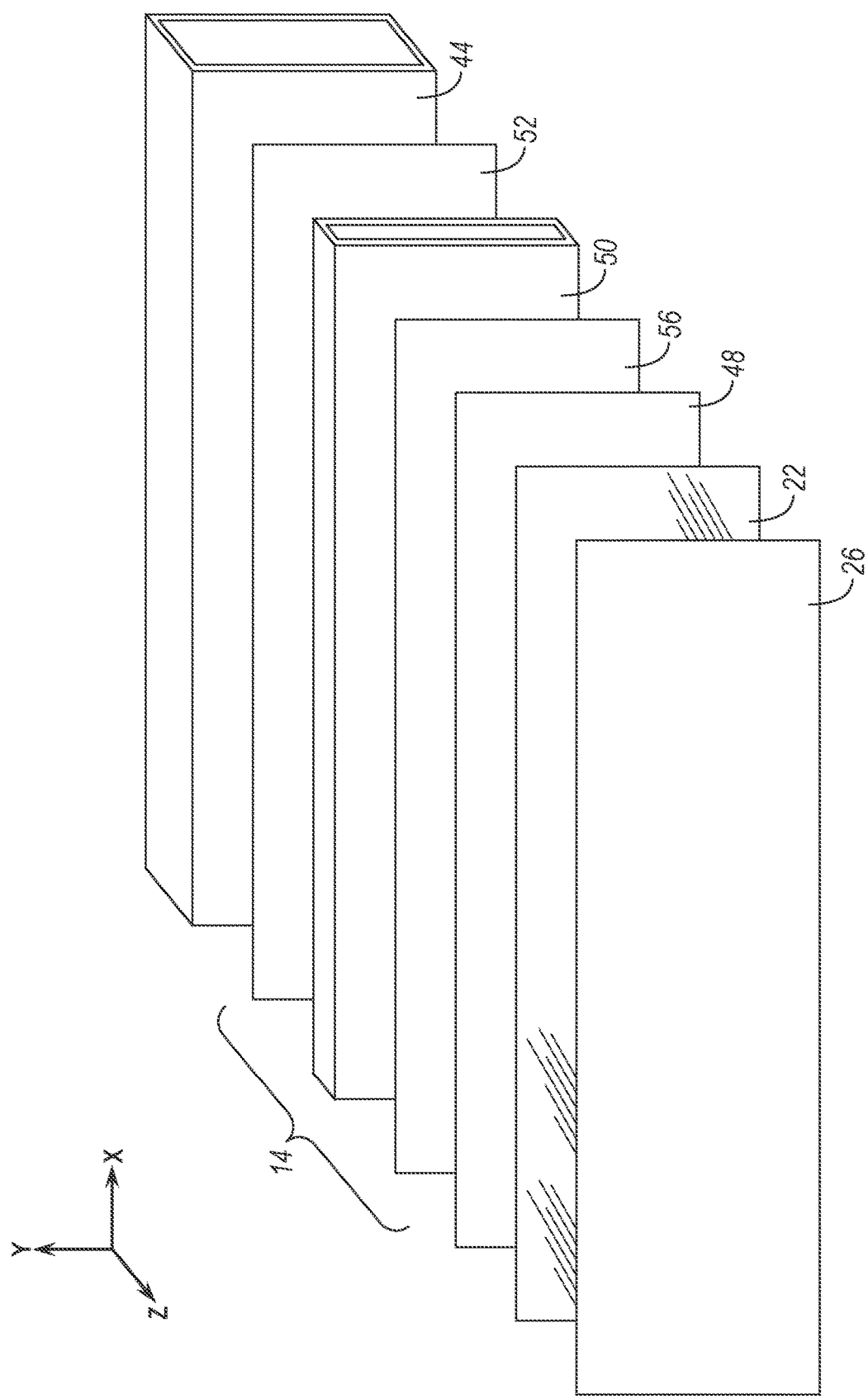
FIG. 2 is a partial exploded view of the rearview mirror assembly of FIG. 1, according to one aspect.

Referring now to FIGS. 1 and 2, the illustrated rearview mirror assembly 10 can be an interior rearview assembly positioned within an interior of a vehicle. When the rearview mirror assembly 10 is an interior rearview assembly, the rearview mirror assembly 10 may be connected to a mount 40, which is adapted to be mounted inside the vehicle in a location proximate to or on a front windshield of the vehicle. It should be noted that the present disclosure is equally applicable to exterior mirrors, as well as other optical assemblies including for example, switchable eyewear, mirror assemblies, architectural window assemblies, aircraft window assemblies, filter assemblies, and vehicle windows including other optical assemblies positioned within bezels and housings.

Still referring to FIGS. 1 and 2, the mirror assembly 10 includes, in order from a rear position (e.g., vehicle forward) to a front position (e.g., vehicle rearward), a light source 44, the display 14, an optional substrate 48, the reflective polarizer 22 and the electro-optic element 26. It will be understood that the reflective polarizer 22 may be positioned on either a vehicle-forward or vehicle-rearward surface of the optional substrate 48 without departing from the teachings provided herein. The light source 44, or light engine, is configured to backlight the display 14 by providing light to a rear of the display 14. The light 18 (FIGS. 9A and 9B) may be polarized or unpolarized. Light 18 from the light source 44 moves in a Z-direction through the rearview mirror assembly 10, through the display 14, and toward the electro-optic element 26. In the depicted example, the display 14 is a liquid crystal display incorporating a liquid crystal medium 50 disposed between two polarizers, an entrance polarizer 52 and an exit polarizer 56. The light source 44 and display 14 may extend the entire length of the rearview mirror assembly 10 creating a "full-display" assembly, or may only extend a portion of the length. It will be appreciated, however, that a concept of a "full-display" assembly, where the display 14, or a plurality of displays, located behind the electro-optic element 26, overlaps in projection onto a viewable surface of assembly 10, with most or all of this viewable surface, is also contemplated by the various examples of this disclosure. The display 14 and/or light source 44 may be angled (e.g., about 3° to about 5°) relative to the reflective polarizer 22 and optionally include an optical bonding adhesive disposed between display 14, the reflective polarizer 22, the optional substrate 48 and other locations.

The entrance and/or exit polarizers 52, 56 may include a reflective polarizer which may be a linear polarizer, an elliptical polarizer or a circular polarizer and might include an optical retarder such as a quarter-wave plate or a half-wave plate. A wire-grid polarizer provides one example of a reflective polarizer that may be used for the entrance and/or exit polarizers 52, 56. Alternatively, a reflective polarizer may include a polymer-based film structure including at least one optically anisotropic layer. Such polymer-based film structure is generally referred to herein as an anisotropic polymer-based film (APBF). Non-limiting examples of APBFs are provided by a multilayered polymer film, including a body of alternating layers of a crystalline-based polymer and another selected polymer, or by micro-structured film-based polarizers, such as brightness enhancement films, or by dual brightness enhancement films.

Figure 9A:
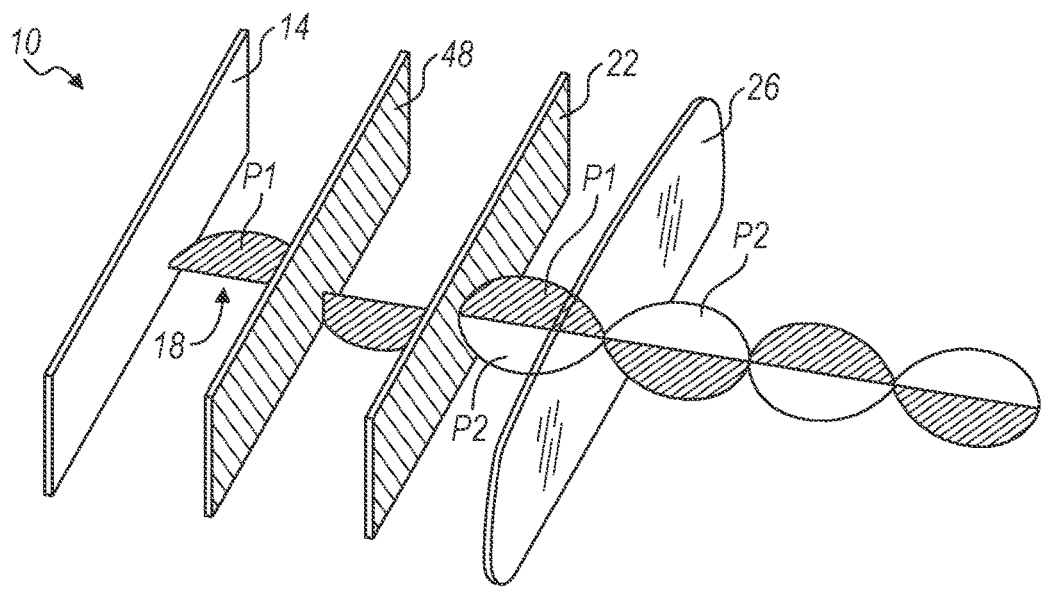
FIG. 9A depicts light interacting with a reflective polarizer and the electro-optic element in a substantially clear state, according to one aspect.
Figure 9B:
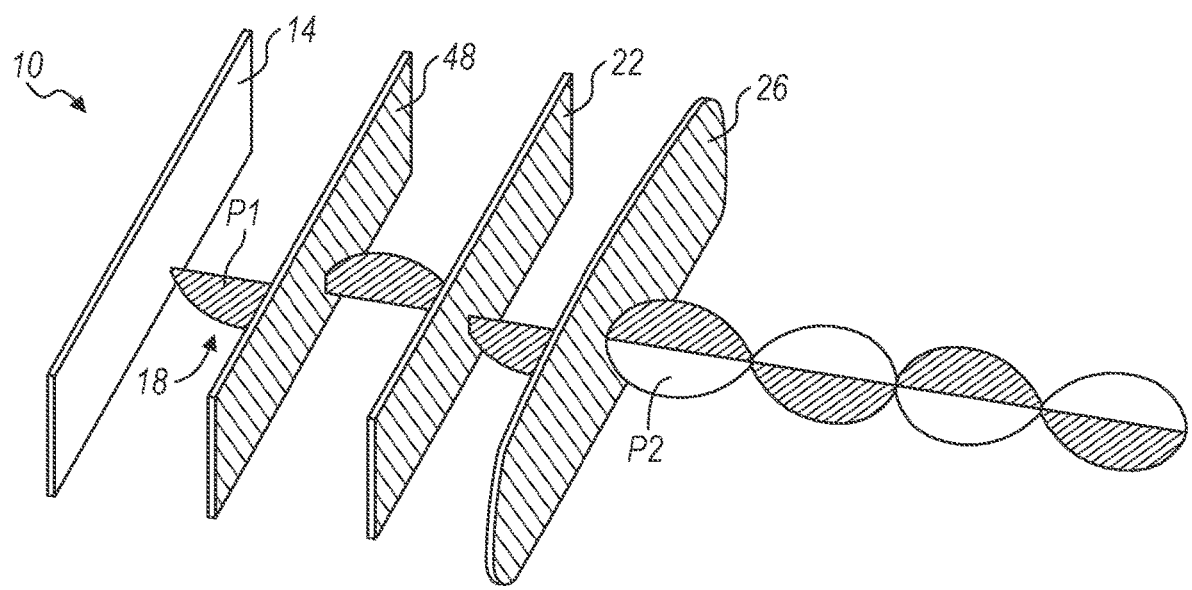
FIG. 9B depicts light interacting with a reflective polarizer and the electro-optic element in a substantially darkened state, according to one aspect.

Positioned vehicle rearward of the display 14 is the optional substrate 48 and the reflective polarizer 22. The optional substrate 48 may be a piece of glass, polymer or other sufficiently optical clear component configured to transmit light from the display 14. The reflective polarizer 22 may be positioned on the substrate 48 (e.g., on a vehicle forward or vehicle rearward surface). In a specific example, the reflective polarizer 22 may be laminated onto a surface of the substrate 48. The reflective polarizer 22 substantially transmits light having one type of polarization (e.g., the first polarization P1, as seen in FIGS. 9A and 9B) while substantially reflecting light of another polarization (e.g., the second polarization P2, as seen in FIG. 9A). This may produce an effect of making the rearview mirror assembly 10 essentially transparent to the light 18 (FIGS. 9A and 9B) having the first polarization P1 generated by the display 14 and/or light source 44, while maintaining a useful level of overall reflectance of unpolarized ambient light having the second polarization P2 (FIG. 9A) incident upon the rearview mirror assembly 10. Similar to the entrance and/or exit polarizers 52, 56, the reflective polarizer 22 may be a linear polarizer, an elliptical polarizer or a circular polarizer and might include an optical retarder such as a quarter-wave plate or a half-wave plate. As explained above, a wire-grid polarizer provides one example of the reflective polarizer 22. Alternatively, the reflective polarizer 22 may include a polymer-based film structure comprising at least one APBF.

Optimization of light transmission from the light engine or light source 44 through the display 14 towards the electro-optic element 26 may be achieved by orienting the reflective polarizer 22 so as to have its transmission axis be collinear, or parallel, with the transmission axis of the exit polarizer 56 of the display 14 (i.e., to allow the light 18 having the first polarization P1 to be transmitted (FIG. 9A)). Alternatively, the reflective polarizer 22 may also be used as a replacement for the exit polarizer 56 of the display 14. In this "maximum transmission" orientation, the reflective polarizer 22 transmits approximately 88.5% of the light 18 having the first polarization P1 emanating from the display 14 and reflects about 50% of the unpolarized ambient light 18 including the second polarization P2 incident upon the reflective polarizer 22 through the electro-optic element 26 back to a viewer of the rearview mirror assembly 10.

Figure 3A:
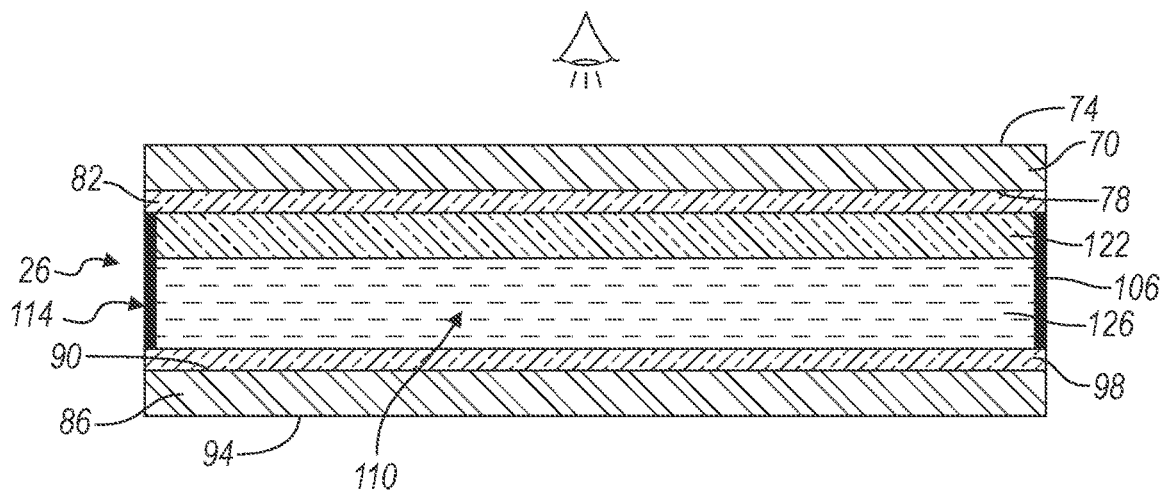
FIG. 3A is a cross-sectional view of an electro-optic element, according to one aspect.
Figure 3B:
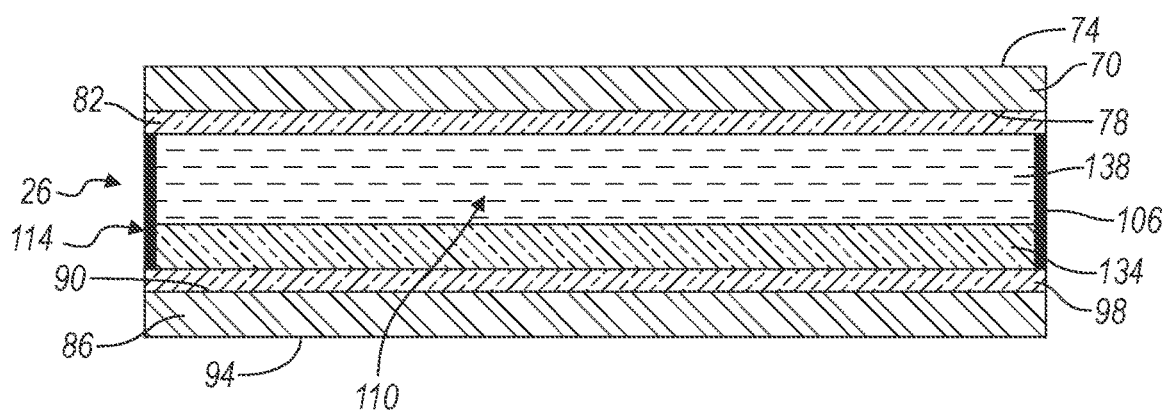
FIG. 3B is a cross-sectional view of an electro-optic element, according to another aspect.
Figure 3C:
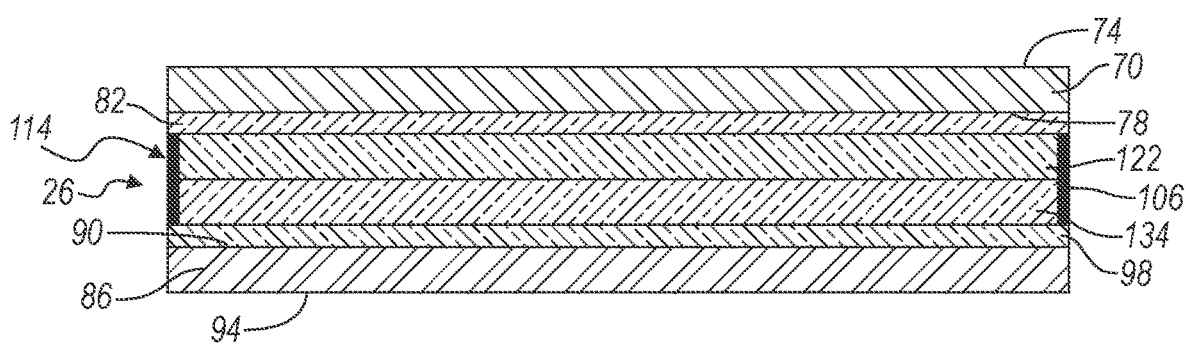
FIG. 3C is a cross-sectional view of an electro-optic element, according to another aspect.
Figure 3D:
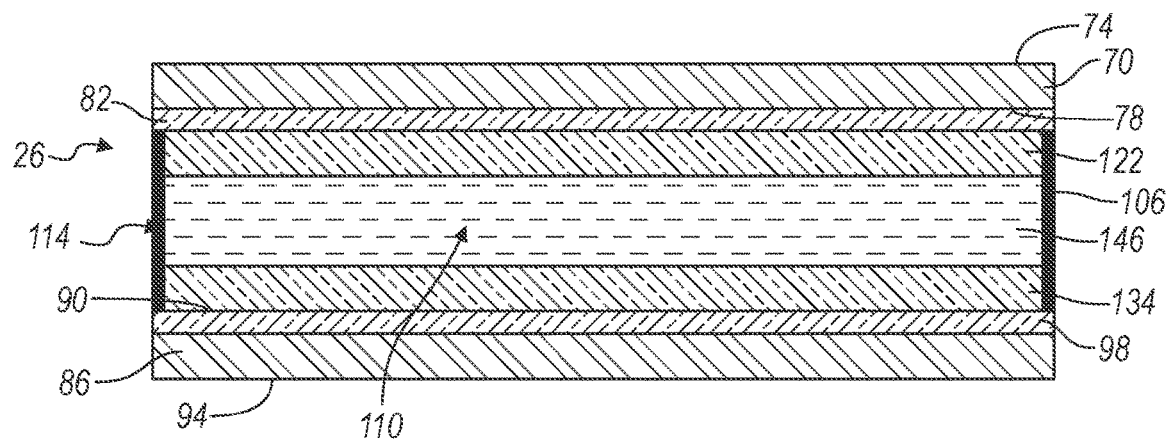
FIG. 3D is a cross-sectional view of an electro-optic element, according to another aspect.
Figure 3E:
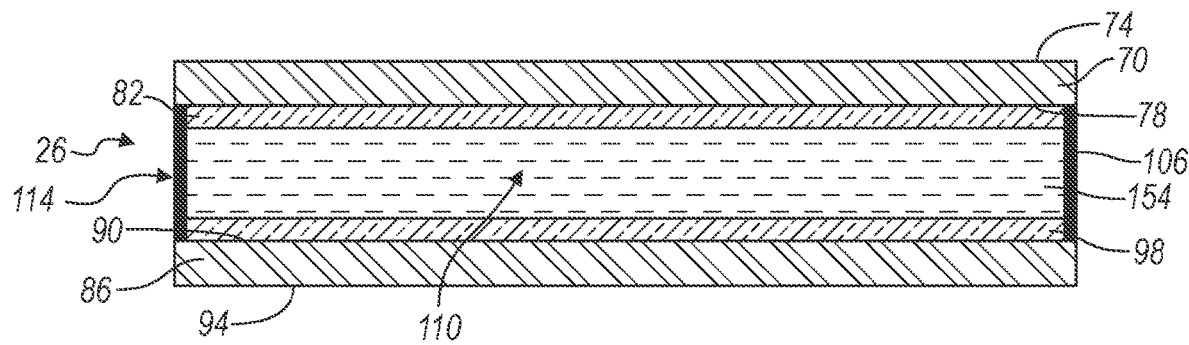
FIG. 3E is a cross-sectional view of an electro-optic element, according to another aspect.

Referring now to FIGS. 2-3E, disposed vehicle rearward of the reflective polarizer 22 is the electro-optic element 26. Use of the electro-optic element 26 allows the rearview mirror assembly 10 to be operable between a transparent state, which allows light of multiple polarizations (e.g., the first and/or second polarizations P1, P2) to pass through and be reflected by it, and a darkened state, in which a portion, or no light, of a certain polarization (e.g., the second polarization P2), is transmitted through the electro-optic element 26 (e.g., the electro-optic element 26 becomes essentially opaque to the second polarization P2). The electro-optic element 26 is operable between a substantially clear state and a substantially dark or darkened state, as well as intermediate states thereto. The darkened state of the electro-optic element 26 is defined relative to the transmissivity of the substantially clear state. Typical transmissivity of the electro-optic element 26 in the substantially clear state may be greater than about 25%, greater than about 50%, greater than about 55%, or greater than about 85%. The percentage of reflectance, transmittance and absorbance of the electro-optic element 26 sum to 100%. Typical transmissivity of the electro-optic element 26 in the substantially darkened state may be less than about 10% less than about 1%, less than about 0.1%, or less than about 0.01%. It will be understood that the transmissivity values in the substantially clear and darkened states is the transmissivity of the light 18 of the second polarization P2.

The electro-optic element 26 includes a first substrate 70 having the front or first surface 74 and a second surface 78. The first surface 74 is a viewer side, as indicated by an eye symbol, and is the vehicle rearward, or viewer facing side, of the rearview mirror assembly 10 (FIG. 1). In some examples, an anti-reflection layer may be disposed over part or the entirety of the first surface 74. A first electrically conductive layer 82 is positioned on the second surface 78. The electro-optic element 26 includes a second substrate 86. The second substrate 86 includes a third surface 90 and a fourth surface 94. The fourth surface 94 of the second substrate 86 is an inward, or vehicle forward, facing surface (e.g., adjacent the reflective polarizer 22). It should be noted that the first substrate 70 and second substrate 86 may be offset along at least a portion of the perimeter of the electro-optic element 26 and/or different sizes to allow for electrical contact to the conductive layers 82 and/or 98. Further, in examples not including the optical substrate 48, the reflective polarizer 22 may be positioned on the third surface 90 or the fourth surface 94 of the electro-optic element 26 without departing from the teachings provided herein. The first and second substrates 70 and 86 can be made of glass, plastic, or other optically transparent or translucent material. The first and second substrates 70, 86 can have a thickness of less than 2.0 mm, less than about 1.2 mm, less than about 0.8 mm, or less than about 0.6 mm. A second electrically conductive layer 98 is positioned on the third surface 90. In various embodiments, the second electrically conductive layer 98 may include a metal reflector or one or more coatings configured as a partially reflective, partially transmissive ("transflective") coating. Further, in examples utilizing the reflective polarizer 22 on the third surface 90, the reflective polarizer 22 may be a wire-grid polarizer and function as the second electrically conductive layer 98 without departing from the teachings provided herein. Inclusion of a metal reflector or a transflective coating may render the electro-optic element 26 at least partially reflective.

Still referring to FIGS. 2-3E, a primary seal 106 traverses an approximate perimeter of, and is configured to cooperate with, the first and second substrates 70, 86 to define a cavity 110 as substantially hermetic. The primary seal 106 may be applied to the first or second substrates 70, 86 by methods commonly used in the liquid crystal display (LCD) industry, such as by silk-screening or dispensing. In one example, the primary seal 106 may incorporate a first and a second seal as components of the primary seal 106. An electro-optic structure 114 is disposed within the cavity 110. In one example, first and second annular bands of highly conductive material are optionally deposited around the perimeter of the first and second substrates 70, 86, respectively, and electrically-conducting structures (e.g., clips or wires) are secured to the highly conductive material and spatially separated from one another. The electrically-conducting structures may supply an electrical voltage to the first and second annular bands of highly conductive material to create a voltage across the electro-optic structure 114, thereby reversibly driving the electro-optic element 26 between the substantially dark and substantially clear states. The first and second annular bands of highly conductive material may include silver, gold or aluminum (such as, for example, in a form of metallic flakes or particles dispersed in a hosting material).

According to at least one embodiment, the electro-optic structure 114 is an electrochromic structure which may include at least one solvent, at least one anodic component or material, and at least one cathodic component or material. It will be understood that the anodic and/or cathodic components may alternatively be referred to as chromophores or electrochromic molecules. Further, it will be understood that the anodic and/or cathodic components may be part of a polymer or a crosslinked network or a monomer. Typically, both of the anodic and cathodic materials are electroactive and at least one of them is electrochromic. It will be understood that regardless of its ordinary meaning, the term "electroactive" may mean a material that undergoes a modification in its oxidation state upon exposure to a particular electrical potential difference. Additionally, it will be understood that the term "electrochromic" may mean, regardless of its ordinary meaning, a material that exhibits a change in its extinction coefficient at one or more wavelengths upon exposure to a particular electrical potential difference. Electrochromic components, as described herein, include materials whose color or opacity are affected by an electrical current, such that when an electrical field is applied to the material, the color or opacity changes from a first state to a second state. The electrochromic component may be a single-layer, single-phase component, multi-layer component, or multi-phase component, as described in U.S. Pat. No. 5,928,572, issued Jul. 27, 1999 and entitled "Electrochromic Layer And Devices Comprising Same," U.S. Pat. No. 5,998,617, issued Dec. 7, 1999 and entitled "Electrochromic Compounds," U.S. Pat. No. 6,020,987, issued Feb. 1, 2000 and entitled "Electrochromic Medium Capable Of Producing A Pre-selected Color," U.S. Pat. No. 6,037,471, issued Mar. 14, 2000 and entitled "Electrochromic Compounds," U.S. Pat. No. 6,141,137, issued Oct. 31, 2000 and entitled "Electrochromic Media For Producing A Pre-selected Color," U.S. Pat. No. 6,241,916, issued Jun. 5, 2001 and entitled "Electrochromic System," U.S. Pat. No. 6,193,912, issued Feb. 27, 2001 and entitled "Near Infrared-Absorbing Electrochromic Compounds And Devices Comprising Same," U.S. Pat. No. 6,249,369, issued Jun. 19, 2001 and entitled "Coupled Electrochromic Compounds With Photostable Dication Oxidation States," U.S. Pat. No. 6,137,620, issued Oct. 24, 2000 and entitled "Electrochromic Media With Concentration Enhanced Stability, Process For The Preparation Thereof and Use In Electrochromic Devices;" U.S. Pat. No. 6,519,072, issued Feb. 11, 2003 and entitled "Electrochromic Device;" and International Patent Application Serial Nos. PCT/US98/05570, published as WO1998/042796 on Oct. 1, 1998, entitled "Electrochromic Polymeric Solid Films, Manufacturing Electrochromic Devices Using Such Solid Films, And Processes For Making Such Solid Films And Devices," PCT/EP98/03862, published as WO1999/02621 on Jan. 21, 1999, entitled "Electrochrome Polymer System," and PCT/US98/05570, published as WO1998/042796 on Oct. 1, 1998, entitled "Electrochromic Polymeric Solid Films, Manufacturing Electrochromic Devices Using Such Solid Films, And Processes For Making Such Solid Films And Devices," which are herein incorporated by reference in their entirety.

Referring now to the example depicted in FIG. 3A, the electro-optic structure 114 includes a cathodic film 122 and an anodic gel 126. As used herein with respect to the anodic and cathodic films and gels of the present disclosure, the term "film" is used to refer to a cross-linked material, whereas the term "gel" is used to refer to a freely diffusing system. In the depicted example, the cathodic film 122 is positioned, or otherwise disposed, on the first electrically conductive layer 82 and the anodic gel 126 is positioned on the second electrically conductive layer 98. It will be understood that the locations of the anodic gel 126 and the cathodic film 122 may be reversed without departing from the spirit and teachings of the disclosure. In electrochromic examples of the electro-optic structure 114, the anodic gel 126 may contain the anodic component and the cathodic film 122 may contain the cathodic component. Thus, the anodic gel 126 may be an electrochromic gel. Examples of possible electrochromic gels can be found in U.S. Pat. No. 6,268,950, issued on Jul. 31, 2001 and entitled "Electrochromic Mirror with Two Thin Glass Elements and a Gelled Electrochromic Medium," and U.S. Pat. No. 7,001,540, issued on Feb. 21, 2006 and entitled "Electrochromic Medium having a Self-healing Cross-linked Polymer Gel and Associated Electrochromic Device," both of which are hereby incorporated by reference in their entirety. Additionally, the anodic gel 126 may contain one or more supporting electrolytes configured to facilitate electrical communication of the first and second electrically conductive layers 82, 98 across the anodic gel 126 and cathodic film 122. The cathodic film 122 may be an electrochromic polymer or network film including a plurality of oriented electrochromic monomer and/or moiety structures forming a backbone of the polymeric or network structure.

Figure 4:
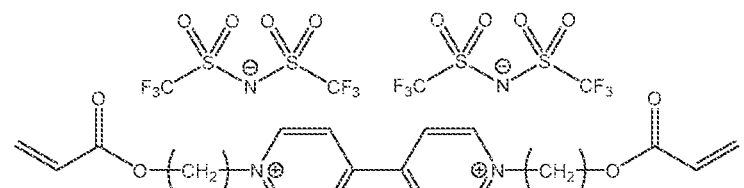
FIG. 4 provides examples of cathodic electrochromic monomers used in part to synthesize an electrochromic polymer film, according to some aspects, FIG. 5 provides examples of cathodic di-acrylate monomers used in part to synthesize an electrochromic polymer film, according to some aspects.
Figure 4:
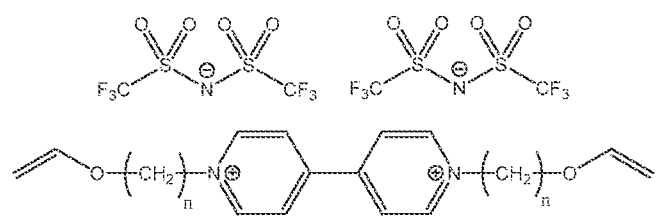
Figure 4:
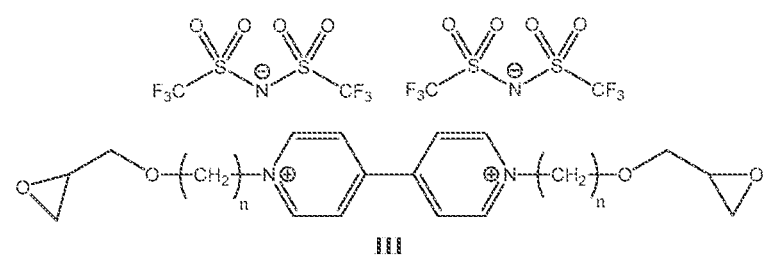
Figure 4:
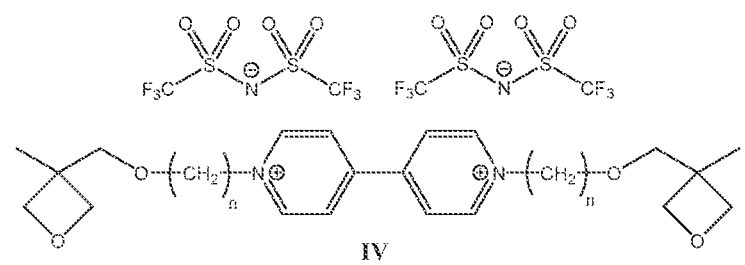

Referring to FIG. 4, the electrochromic polymer or network film of the cathodic film 122 may be a polymer or copolymer synthesized from a cathodic di-acrylate viologen monomer, a cathodic di-vinyl viologen monomer, a cathodic di-vinyl ether viologen monomer, a cathodic di-epoxy viologen monomer, a cathodic di-oxetane viologen monomer, a cathodic di-hydroxy viologen monomer, or a combination thereof. Both the polymerizable functional groups and the substituents attached to the viologen monomer may be varied as known to one skilled in the art to modify the structure property characteristics. The length of the alkyl spacer "n" used in FIG. 4 may be any integer between 1 and 50, between 1 and 25, between 5 and 25, between 3 and 15, or between 5 and 12. In some examples, n may be 6 or n may be 11. The alkyl spacer may also contain alkyl branching. In some examples, the anionic counterion may be a bis-((trifluoromethyl)sulfonyl) amide or $N(CF_3SO_2)_2^-$. In other examples, the anionic counterion may be any known anions used in the art for electrochromic and/or electro-optic devices, like $F^-$, $Cl^-$, $Br^-$, $I^-$, $BF_4^-$, $PF_6^-$, $SbF_6^-$, $AsF_6^-$, $ClO_4^-$, $SO_3CF_3^-$, $N(CN)_2^-$, $C(CF_3SO_2)_3^-$, $N(SO_2C_2F_5)_2^-$, $Al(OC(CF_3)_3)_4^-$. Monomers used to make an electrochromic polymer or network film of the cathodic film 122 may include a di-acrylate viologen monomer, a di-methacrylate viologen monomer, a di-vinyl viologen monomer, a di-vinyl ether viologen monomer, a di-epoxy viologen monomer, a di-oxetane viologen monomer, a di-hydroxy viologen monomer, or a combination thereof. The cathodic film 122 may also contain a chain extender or linker including, for example, 1,4-dithiolbutane or 1-aminobutane. The cathodic film 122 may additionally include a binder polymer (e.g., polymethylmethacrylate (-PMMA), polyvinyl formal, or polyethylene glycol), a plasticizer that will help facilitate ion conductivity (e.g., propylene carbonate or gamma-butyrolactone) and a supporting electrolyte (e.g., tetraethylammonium tetrafluoroborate or lithium hexafluorophosphate). In some examples, the backbone of the polymer chains may have one or more pendant groups extending therefrom. In examples of the electro-optic structure 114 including the cathodic film 122, the cathodic component may be covalently dispersed throughout the crosslinked polymer as incorporated in the structure of the monomer units. In some examples, the cathodic component may additionally or alternatively be incorporated into the polymer backbone or network with other liquid crystal monomers. In at least one example, the cathodic film 122 may be oriented and/or aligned as monomers in a nematic phase and then UV and/or thermally polymerized and/or crosslinked to form the electrochromic polymer or network film having anisotropy in either a nematic or smectic phase, such that electrochromic moieties of the cathodic film 122 are substantially aligned, as explained in greater detail below.

Figure 5:
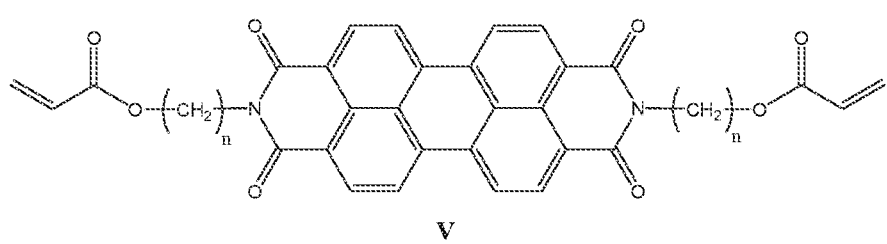
Figure 5:
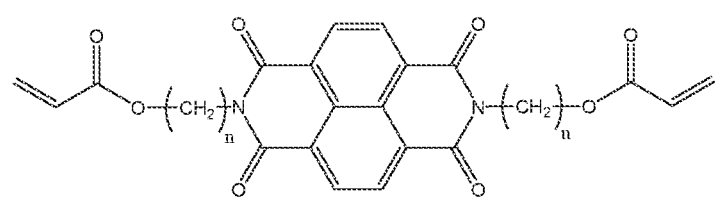

Referring to FIG. 5, the electrochromic polymer or network film of the cathodic film 122 may include a neutral cathodic monomer like 2,7-bis-(vinyl-ether)-benzo(lmn)(3,8)phenanthroline-1,3,6,8-tetraone, cathodic 2,7-bis-(vinyl)-benzo(lmn)(3,8)phenanthroline-1,3,6,8-tetraone, neutral cathodic 2,7-bis-(acrylate)-benzo(lmn)(3,8)phenanthroline-1,3,6,8-tetraone, neutral cathodic 2,7-bis-(epoxy)-benzo(lmn)(3,8)phenanthroline-1,3,6,8-tetraone, neutral cathodic 2,7-bis-(oxetane)-benzo(lmn)(3,8)phenanthroline-1,3,6,8-tetraone, neutral cathodic 2,7-bis-(hydroxy)-benzo(lmn)(3,8)phenanthroline-1,3,6,8-tetraone, 2,9-bis(vinyl ether)-anthra[2,1,9-def:6,5,10-d'e'f']diisoquinoline, neutral cathodic 1,3,8,10-tetraone, 2,9-bis(vinyl)-anthra[2,1,9-def:6,5,10-d'e'f']diisoquinoline, neutral cathodic 1,3,8,10-tetraone, 2,9-bis(acrylate)-anthra[2,1,9-def:6,5,10-d'e'f']diisoquinoline, neutral cathodic 1,3,8,10-tetraone, 2,9-bis(epoxy)-anthra[2,1,9-def:6,5,10-d'e'f']diisoquinoline, neutral cathodic 1,3,8,10-tetraone, 2,9-bis(oxetane)-anthra[2,1,9-def:6,5,10-d'e'f']diisoquinoline, neutral cathodic 1,3,8,10-tetraone, 2,9-bis(hydroxy)-anthra[2,1,9-def:6,5,10-d'e'f']diisoquinoline, or a combination thereof. The length of the alkyl spacer "n" used in FIG. 5 may be any integer between 1 and 50, between 1 and 25, between 5 and 25, between 3 and 15, or between 5 and 12. In some examples, n may be 6 or n may be 11. The alkyl spacer may also contain alkyl branching.

The anodic gel 126 may be in a semi-liquid state capable of ionically transporting the anodic component to the cathodic component within the cathodic film 122. For example, the anodic gel 126 may permeate the cathodic film 122 with the one or more electrolytes and/or anodic components. In the depicted example, either or both of the cathodic and anodic components of the cathodic film 122 and anodic gel 126, respectively, may be electrochromic.

Referring now to the example depicted in FIG. 3B, the electro-optic structure 114 includes an anodic film 134 and a cathodic gel 138. In the depicted example, the anodic film 134 is positioned, or otherwise disposed, on the second electrically conductive layer 98 and the cathodic gel 138 is positioned on the first electrically conductive layer 82. It will be understood that the locations of the cathodic gel 138 and the anodic film 134 may be reversed without departing from the spirit and teachings of the disclosure. In at least one example, the anodic film 134 may be stretch oriented, or aligned, as explained in greater detail below. In electrochromic examples of the electro-optic structure 114, the cathodic gel 138 may contain the cathodic component and the anodic film 134 may contain the anodic component. Thus, the cathodic gel 138 may be an electrochromic gel. Additionally, the cathodic gel 138 may contain one or more supporting electrolytes configured to facilitate electrical communication of the first and second electrically conductive layers 82, 98 across the cathodic gel 138 and anodic film 134. The anodic film 134 may be an electrochromic polymer or network film including a plurality of oriented electrochromic monomer and/or moiety structures forming a backbone of the polymeric or network structure.

Figure 6:
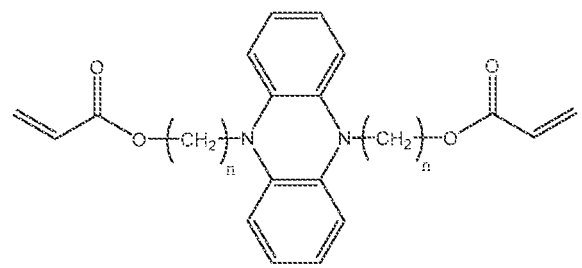
FIG. 6 provides examples of anodic di-acrylate monomers used in part to synthesize an electrochromic polymer film, according to some aspects.
Figure 6:
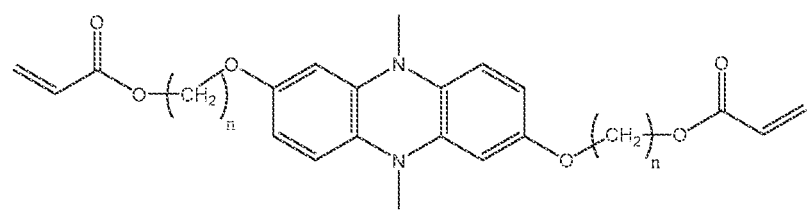
Figure 6:
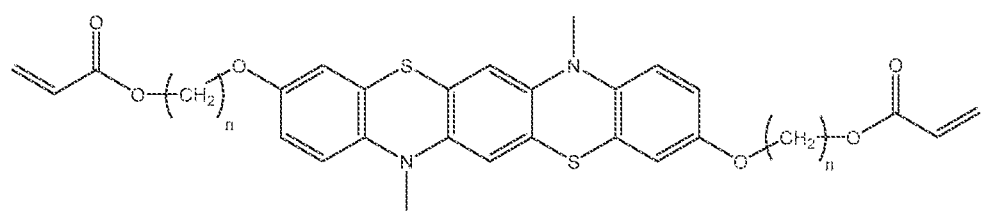

Referring to FIG. 6, the electrochromic polymer or network film of the anodic film 134 may include monomers like an anodic 5, 10-di-(vinyl-ether)-5,10-dihydrophenazine, an anodic 5, 10-di-(vinyl)-5,10-dihydrophenazine, an anodic 5, 10-di-(acrylate)-5,10-dihydrophenazine, an anodic 5,10-di-(methacrylate)-5,10-dihydrophenazine, an anodic 5, 10-di-(epoxy)-5,10-dihydrophenazine, an anodic 5, 10-di-(oxetane)-5,10-dihydrophenazine, an anodic 5,10-di-(hydroxy)-5,10-dihydrophenazine, an anodic 5, 10-dimethyl-5,10-dihydrophenazine-2, 7-di-(vinyl ether), an anodic 5, 10-dimethyl-5,10-dihydrophenazine-2, 7-di-(vinyl), an anodic 5, 10-dimethyl-5,10-dihydrophenazine-2, 7-di-(acrylate), an anodic 5,10-dimethyl-5,10-dihydrophenazine-2,7-di-(methacrylate), an anodic 5, 10-dimethyl-5,10-dihydrophenazine-2, 7-di-(epoxy), an anodic 5, 10-dimethyl-5,10-dihydrophenazine-2, 7-di-(oxetane), an anodic 5,10-dimethyl-5,10-dihydrophenazine-2,7-di-(hydroxy), an anodic 7,14-dimethyl-7,14-dihydrobenzo[5,6][1,4]thiazino[2,3-b]phenothiazine-3,10-di-(vinyl ether), an anodic 7,14-dimethyl-7,14-dihydrobenzo[5,6][1,4]thiazino[2,3-b]phenothiazine-3,10-di-(vinyl), an anodic 7,14-dimethyl-7,14-dihydrobenzo[5,6][1,4]thiazino[2,3-b]phenothiazine-3,10-di-(acrylate), an anodic 7,14-dimethyl-7,14-dihydrobenzo[5,6][1,4]thiazino[2,3-b]phenothiazine-3,10-di-(methacrylate), an anodic 7,14-dimethyl-7,14-dihydrobenzo[5,6][1,4]thiazino[2,3-b]phenothiazine-3,10-di-(epoxy), an anodic 7,14-dimethyl-7,14-dihydrobenzo[5,6][1,4]thiazino[2,3-b]phenothiazine-3,10-di-(oxetane), an anodic 7,14-dimethyl-7,14-dihydrobenzo[5,6][1,4]thiazino[2,3-b]phenothiazine-3,10-di-(dihydroxy), or a combination thereof. In some examples, the backbone of the polymer chains may have one or more pendant groups extending therefrom. In a specific example, the anodic film 134 may include 2,7-bis (2-hydroxyethyl)-5,10 hydro-5,10-bis(neopentyl)phenazine and multi-functional isocyanate crosslinker like tolylene-2, 4-diisocyanate, or methylene diphenyl diisocyanate (MDI) and/or hexamethylene diisocyanate trimer (HDT) copolymer. The length of the alkyl spacer "n" used in FIG. 4 may be any integer between 1 and 50, between 1 and 25, between 5 and 25, between 3 and 15, or between 5 and 12. In some examples, n may be 6 or n may be 11. The alkyl spacer may also contain alkyl branching. The anodic film 134 may include a binder polymer (e.g., polymethylmethacrylate (PMMA), polyvinyl formal, or polyethylene glycol), a plasticizer that will help facilitate ion conductivity (e.g., propylene carbonate or gamma-butyrolactone) and a supporting electrolyte (e.g., tetraethylammonium tetrafluoroborate or lithium hexafluorophosphate). In examples of the electro-optic structure 114 including the anodic film 134, the anodic component may be covalently dispersed throughout the crosslinked polymer as incorporated in the structure of the monomer units. In some examples, the cathodic component may additionally or alternatively be incorporated into the polymer backbone or network with other liquid crystal monomers. In at least one example, the anodic film 134 may be oriented and/or aligned as monomers in a nematic phase and then polymerized to form the electrochromic polymer or network film having anisotropy in either a nematic or smectic phase, such that the polymeric chains of the anodic film 134 are substantially aligned, as explained in greater detail below.

The cathodic gel 138 may be in a semi-liquid state capable of ionic transport and diffusion of the cathodic component to the anodic component bound within the anodic film 134. For example, the cathodic gel 138 may permeate the anodic film 134 with the one or more electrolytes and/or cathodic components. In the depicted example, either or both of the anodic and cathodic components of the anodic film 134 and cathodic gel 138, respectively, may be electrochromic.

Referring now to the example depicted in FIG. 3C, the electro-optic structure 114 includes both the cathodic film 122 and the anodic film 134. The cathodic film 122 and the anodic film 134 may be in direct contact with one another, or may be separated (e.g., by a film which is configured to promote electrical or ion exchange). As explained above, the cathodic and anodic films 122, 134 may be the first and second electrochromic polymer or network films, respectively, including the cathodic moieties and anodic moieties disposed along the backbone, or on pendants, of the polymeric chains of the cathodic and anodic films 122, 134, respectively. Further, the cathodic and anodic films 122, 134 may be polymerized such that the electrochromic moieties covalently built into the polymeric chains of the cathodic and anodic films 122, 134 are substantially oriented and aligned. In such examples, the electrochromic moieties covalently incorporated into the polymeric backbones of the cathodic and anodic films 122, 134 may be substantially aligned with respect to one another. The cathodic and/or anodic components may be electrochromic in such an example.

Referring now to the example depicted in FIG. 3D, the electro-optic structure 114 includes both the cathodic film 122 and the anodic film 134 in addition to an electrolyte layer 146. The electrolyte layer 146 may be a gel (e.g., a semi-liquid configured to permeate the cathodic and anodic films 122, 134) or polymeric electrolyte. In examples utilizing a polymeric or gel electrolyte as the electrolyte layer 146, the polymeric electrolyte may include Poly(styrene-ran-ethylene), Polystyrene-block-poly(ethylene-ran-butylene), Poly(styrene-ran-ethylene), Polystyrene-block-poly (ethylene/butylene)-block-polystyrene, Poly(ethylene glycol), Poly(methyl methacrylate), Poly(2-hydroxyethyl-methacrylate-ran-methylacrylate), or other polymer gels disclosed in other polymer electrolytes and/or combinations thereof. Additional electrochromic gels and materials can be found in U.S. Pat. No. 6,268,950, issued Jul. 31, 2001 and entitled "Electrochromic Mirror with Two Thin Glass Elements and a Gelled Electrochromic Medium," and U.S. Pat. No. 7,001,540, issued Feb. 21, 2006 and entitled "Electrochromic Medium having a Self-healing Cross-linked Polymer Gel and Associated Electrochromic Device," both of which are hereby incorporated by reference in their entirety. The polymeric or gel electrolyte may additionally include a plasticizer that will help facilitate ion conductivity (e.g., propylene carbonate or gamma-butyrolactone) and a supporting electrolyte (e.g., tetraethylammonium tetrafluoroborate or lithium hexafluorophosphate). As explained above, the first and second electrochromic polymer or network films of the cathodic and anodic films 122, 134 may be substantially aligned with one another. The electrolyte layer 146 may partially permeate the cathodic and anodic films 122, 134.

Referring now to the example depicted in FIG. 3E, the electro-optic structure 114 may include an electro-optic film 154. The electro-optic film 154 may be a mixed electrochromic polymer or network film composed of a plurality of polymeric chains, similar to the cathodic and anodic films 122, 134 (FIGS. 3C and 3D). In such an example, the electro-optic film 154 may contain both the anodic component and the cathodic component on the backbones of the polymeric chains, and/or as pendant groups. In some examples, the anodic component and cathodic component may both be positioned on the same polymer chains, while in other examples, the anodic component and cathodic component may be positioned on separate polymeric chains. Similarly to the cathodic and anodic films 122, 134, the polymeric chains of the electro-optic film 154 may be substantially aligned and locked into place using various polymerization techniques known in the art. The polymeric network film 154 may additionally include a plasticizer that will help facilitate ion conductivity (e.g., propylene carbonate or gamma-butyrolactone) and a supporting electrolyte (e.g., tetraethylammonium tetrafluoroborate or lithium hexafluorophosphate).

Figure 7:
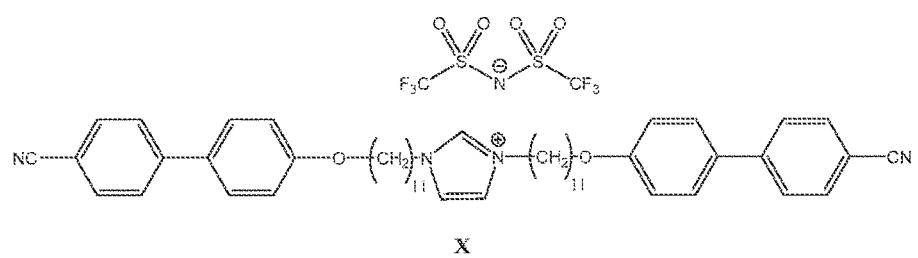
FIG. 7 provides examples of liquid crystal molecules that can be used as a component in the synthesis of an electrochromic polymer film, according to some aspects.
Figure 7:
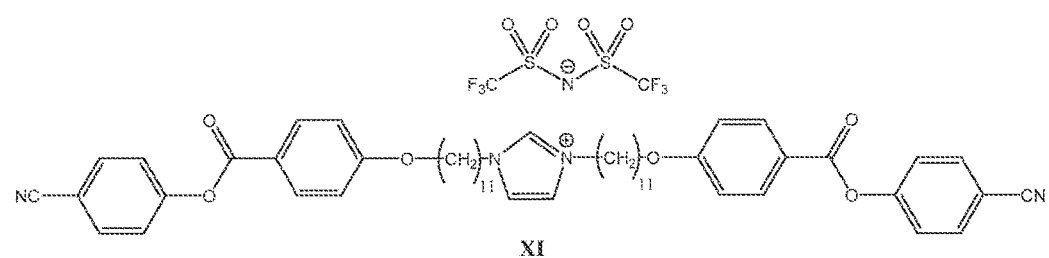
Figure 7:
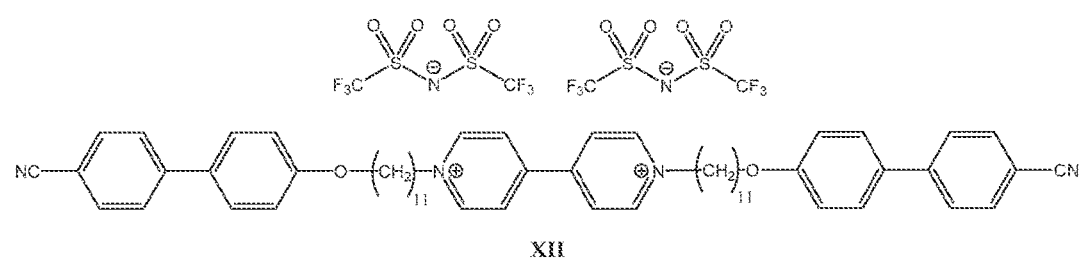
Figure 7:
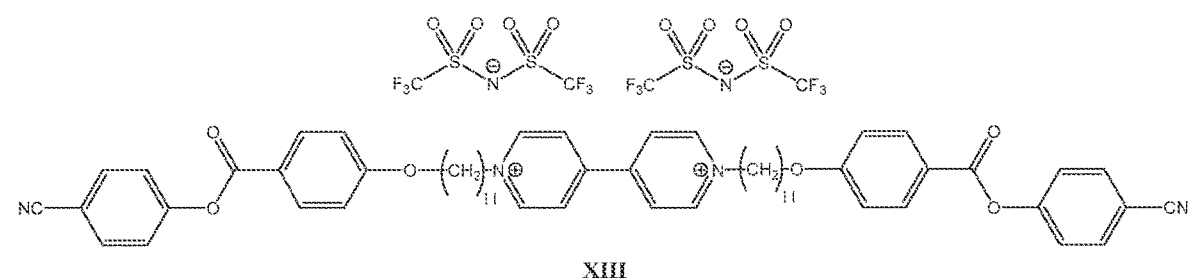
Figure 8A:
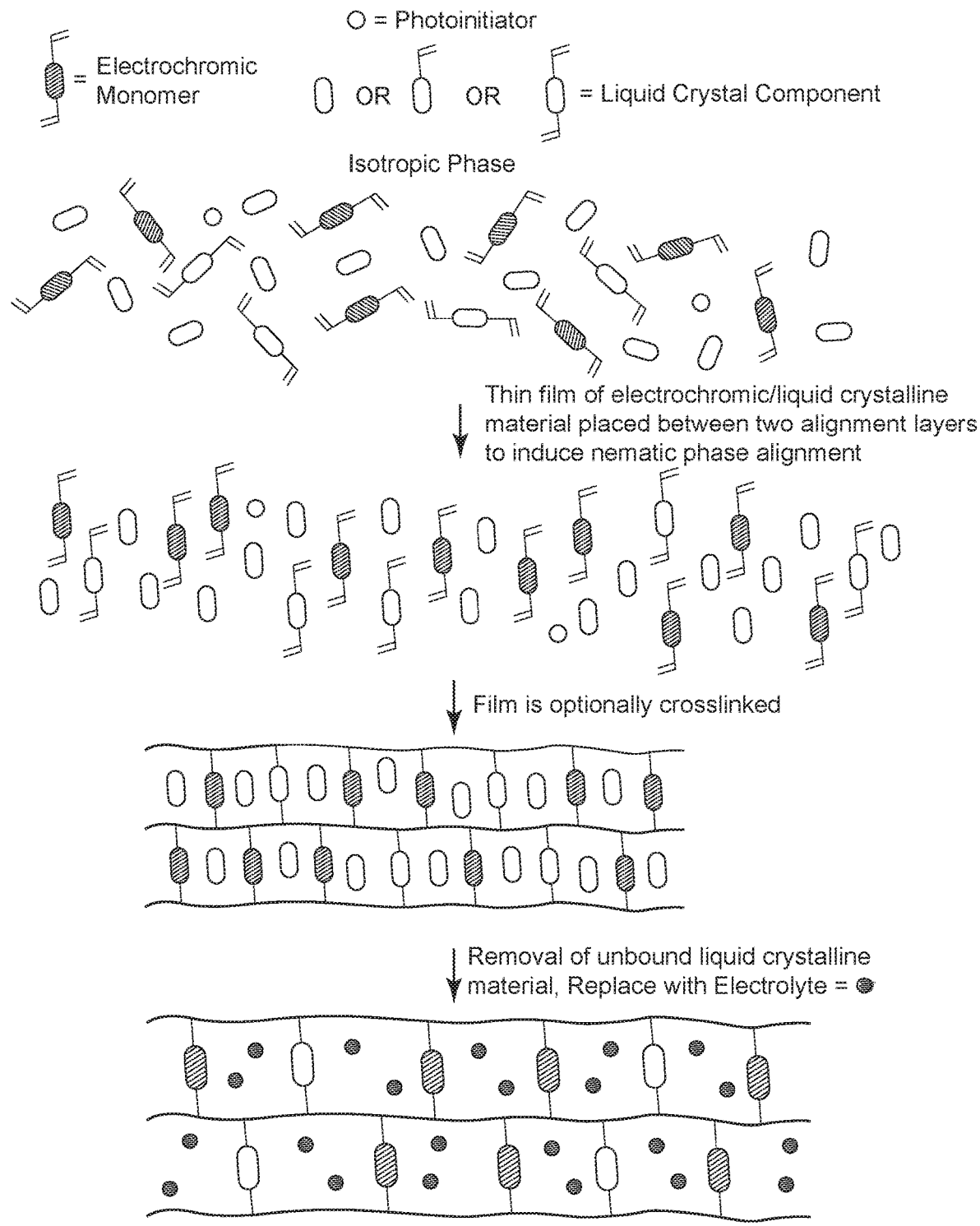
FIG. 8A depicts a sample methodology used to synthesize a variety of electrochromic polymer films, according to some aspects.
Figure 8B:
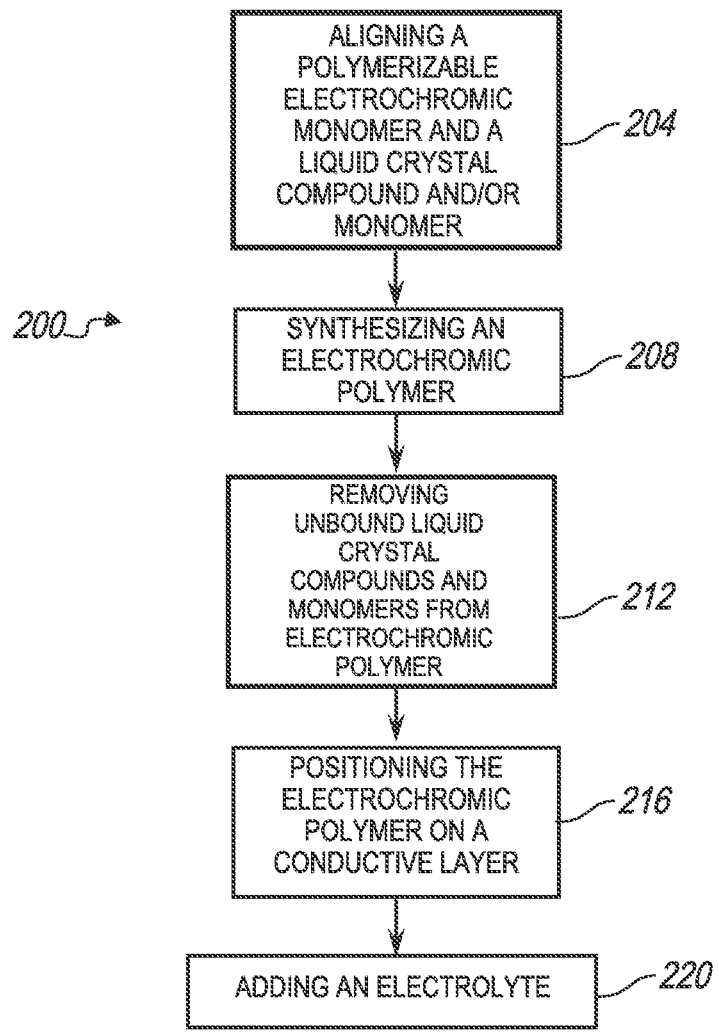
FIG. 8B depicts a method of forming an electro-optic element, according to one aspect.

Referring now to FIGS. 7 and 8A-8B, synthesis of the electrochromic polymer or network film of the present disclosure can be facilitated by the inclusion of one or more liquid crystalline components in a mixture with electrochromic moieties used to form the electrochromic polymer or network film. The liquid crystalline components can include liquid crystal molecules having polymerizable groups that allow the liquid crystalline component to be incorporated into the synthesized electrochromic polymer or network film or may be in the form of molecules that are present during synthesis of the electrochromic polymer or network film, but not incorporated into the synthesized electrochromic polymer or network film. In some examples, synthesis of the electrochromic polymer or network film can include a combination of these different types of liquid crystalline components. While not intending to be limiting, it is theorized that the liquid crystalline components can be utilized to maintain the reaction mixture of the electrochromic moieties in a liquid crystalline state during synthesis of the electrochromic polymer or network film. Maintaining the reaction mixture in a liquid crystalline state can facilitate alignment and/or orientation of the electrochromic moieties during polymerization and/or cross-linking of the electrochromic polymer or network film. According to one aspect of the present disclosure, the electrochromic moieties can be combined with a liquid crystalline mesogen or a mixture of liquid crystalline mesogens which are capable of existing in a liquid crystalline state when combined with the electrochromic moieties.

In one aspect, the liquid crystalline component can include one or more liquid crystal monomers having at least one active polymerizable group, non-limiting examples of which include a vinyl group, a vinyl ether group, an epoxy group, an acrylate group, an oxetyl group, a hydroxyl group, or a combination thereof. The liquid crystal monomers may be incorporated into the electrochromic polymer film or network, which may help with alignment and orientation between both the electrochromic moieties and the liquid crystal moieties.

In another aspect, the liquid crystalline component may not be incorporated into the electrochromic polymer film or network, but still facilitate synthesis of the electrochromic polymer film or network. For example, the liquid crystalline component can include liquid crystal molecules that do not contain polymerizable groups and which are not covalently incorporated into the electrochromic polymer or network film. The liquid crystal molecules that are not incorporated into the electrochromic polymer film or network can help orient the electrochromic moieties to facilitate polymerization into a polymer chain and/or polymer network where the electrochromic moieties are both covalently aligned and oriented. In some examples, the liquid crystal molecules contain an imidazolium moiety that may be used to promote chemical compatibility with the electrochromic monomer, such molecules are highlighted in Goossens, K. et. al. (2008) Imidazolium Ionic Liquid Crystals with Pendant Mesogenic Groups, *Chem. Mater.*, 20, 157-168, the contents of which are incorporated by reference herein in their entirety.

FIG. 7 illustrates examples of liquid crystalline mesogens that can be used alone and/or in combination with other materials during the synthesis of the electrochromic polymer or network film according to an aspect of the invention to facilitate keeping the reaction mixture in a liquid crystalline state. The example liquid crystalline mesogen X of FIG. 7 includes two 4-cyanobiphenyl groups coupled with an imidazolium moiety by an alkyl spacer group. The example mesogen X of FIG. 7 may be capable of remaining in the nematic phase when combined with other nematic liquid crystal compounds, non-limiting examples of which include 4-cyanophenyl 4-hexylbenzoate, and/or 4-cyanophenyl 4-heptylbenzoate. Other liquid crystalline mesogens which are capable of the formation of a nematic phase when combined with the electrochromic moieties according to the present disclosure, either alone or in combination with other materials, can also be utilized to form the aligned electrochromic polymer or network film. Compounds XI, XII, and XIII of FIG. 7 illustrate non-limiting examples of liquid crystalline mesogens that can be utilized, either alone or in combination with other liquid crystalline mesogens and/or other additives, during synthesis of the electrochromic polymer or network film.

Referring now to FIG. 8A, the general approach to forming the electro-optic structure 114 is provided according to some examples of the present disclosure. Using this approach, a homogeneous solution of an electrochromic monomer, a liquid crystal component, such as a liquid crystal monomer, a liquid crystal compound or a liquid crystal mixture, and a photoinitiator may be combined. This homogeneous solution may be positioned between one or two alignment layers to induce uniform alignment of a nematic liquid crystalline phase in the resultant layer. Using a UV light source, the aligned layer including the electrochromic monomer, the liquid crystal molecule, and the photoinitiator may be polymerized and/or crosslinked to lock in the alignment of the electrochromic moieties. Any unreacted monomers or liquid crystal molecules that are unbound or noncovalently coupled to the resultant polymer network can be removed and/or then replaced with an electrolyte and/or solvent. Alternatively, a homogeneous aligned nematic film containing an electrochromic monomer, a liquid crystal component, such as a liquid crystal monomer, a liquid crystal compound, or a liquid crystal mixture, a thermal initiator, and/or thermal crosslinker group may be thermally cured to polymerize and/or crosslink the monomer system to form the electrochromic polymer or network film to lock in the alignment of the corresponding electrochromic moieties. Any unreacted monomers or liquid crystal molecules that are unbound or non-covalently coupled to the resultant polymer network can optionally be removed and/or then replaced with an electrolyte and/or solvent.

Referring now to FIG. 8B, depicted is an exemplary method 200 having steps 204, 208, 212, 216, and 220 for forming the electro-optic structure 114. Step 204 includes aligning an electrochromic monomer with a liquid crystal compound and/or monomer. FIGS. 4-6 provide exemplary cathodic monomers and anodic monomers that could be used in any combination to provide aligned films having anisotropic properties including, for example, nematic and smectic phases.

Step 208 may be performed by polymerizing the electrochromic monomer and the liquid crystal monomer to synthesize the electrochromic polymer or network film (e.g., the polymers of the cathodic, anodic, or electro-optic films 122, 134, 154). Unlike typical chain growth polymerization reactions that typically result in a random, tangled, and disordered state of the polymeric chains, the UV or thermal polymerization of the aligned films provided in step 204 can yield ordered polymer chains and/or networks with a built in or locked ordering of the electrochromic moieties. Polymerizing the aligned films provided in step 204 using UV or thermal techniques may align greater than 10%, 20%, 30%, 40%, 50%, 60%, 70%, 80% or greater than 90% of the electrochromic and/or liquid crystalline moieties of the resultant polymerized electrochromic polymer films. In some examples, the photo initiator used to initiate the UV radical photo-polymerization is IRGACURE 651 or 2,2-dimethoxy-1,2-diphenylethan-1-one. In some examples, the photo initiator used to initiate the UV super acid photo-polymerization is a triarylsulfonium salt. The choice of initiator will depend on the monomers used to construct the electrochromic polymer or network film. Many other photo initiators are envisioned to be applicable as appreciated by one skilled in the art.

Step 212 may be performed by removing the liquid crystal compounds that are unbound to the electrochromic polymer or network film. Depending on the desired application or physical properties, the liquid crystal compounds used to help impart order in the aligned film described in step 204 may be removed once the remaining electrochromic and/or liquid crystal moieties have been orderly incorporated into the resultant electrochromic polymer or network film. The unbound or noncovalently coupled liquid crystal compounds, fillers, and/or reagents may all be removed using techniques known in the art to yield a more purified version of the resultant electrochromic polymer or network film. The unbound or noncovalently coupled liquid compounds or monomers may also be allowed to be absorbed by the electrolyte gel layers, for example, 126, 138, 146, during the construction of the electro-optical device.

Next, step 216 of positioning the electrochromic polymer or network film on a conductive layer (e.g., at least one of the first and second electrically conductive layers 82, 98) is performed to form at least one of the cathodic, anodic and electro-optic films 122, 134, 154. The electro-optic polymer may be bonded, adhered to or otherwise coupled to the at least one of the first and second electrically conductive layers 82, 98. In a specific example, the electro-optic polymer may be laminated to at least one of the first and second electrically conductive layers 82, 98. Alternatively, the electrochromic polymer or network film can be directly formed on at least one of the first or second electrically conductive layers 82 or 98 directly. The electrochromic polymer or network film is in direct contact with at least one of the first and second electrically conductive layers 82, 98. In examples utilizing two layers of electrochromic polymer or network film, the films may be aligned parallel to one another, however, it will be understood that in examples where only one electro-optic polymer exhibits an extinction coefficient within a visible waveband of light, the two layers need not be parallel to one another.

Lastly, step 220 of adding an electrolyte is performed. In some examples, the electrolyte may include a supporting salt, such as tetraethylammonium tetrafluoroborate or lithium hexafluorophosphate or possibly other supporting electrolyte salts known to a person skilled in the art. The amount and extent of electrolyte doping can be varied depending on the desired properties or desired application of the final material used.

Referring now to FIGS. 9A and 9B, use of the present disclosure may allow for the selective reduction of a certain polarization of light. For example, by positioning the cathodic and/or anodic components (at least one of which is electrochromic) on the backbone of the polymer chains, with alignment of the electrochromic moiety of the electro-optic polymer or network may result in the absorption of only one polarization of light (e.g., the first or second polarizations P1, P2). For example, the cathodic moieties and/or anodic moieties of the cathodic and/or anodic films 122, 134, respectively, may be aligned such that in the clear state (FIG. 9A) light of both the first and second polarizations P1, P2 may pass through the electro-optic element 26, while in the darkened state (FIG. 9B) light of only one polarization (e.g., the first polarization P1) may pass. In this manner, the cathodic and anodic films 122, 134 can be considered as variably transmissive to light of a particular polarization (e.g., the second polarization P2). As such, the electro-optic element 26 may be used to allow the rearview mirror assembly 10 to reversibly change between a conventional mirror and an electronic display. For example, when the electro-optic element 26 is in the clear state, light from around the rearview mirror assembly 10, having both the first and second polarizations P1, P2, may pass through the electro-optic element 26 and be reflected by the reflective polarizer 22. The reflected second polarization P2 originating external to the rearview mirror assembly 10 typically has a higher luminance than the light 18 having the first polarization P1 emitted from the display 14. As such, when the electro-optic element 26 is in the clear state and does not absorb the second polarization P2, the second polarization P2 washes out the first polarization P1 and a viewer of the assembly 10 perceives a reflected image. However, when the electro-optic element 26 is in the darkened state and absorbs the second polarization P2, the relative contrast of the first polarization P1 is greater and the viewer is able to perceive an image formed by the display 14. With the use of such rearview mirror assemblies 10, the contrast of the illumination from the display 14, as perceived by the driver through reflective polarizer 22 and/or electro-optic element 26 against a background of ambient light reflected by the reflective polarizer 22, remains quite low, particularly when the ambient light is plentiful such as on a bright sunny day. The contrast may be defined as the ratio of the intensity of light generated by the display 14 reaching the viewer and the intensity of ambient light reflected by the reflective polarizer 22.

Use of the forgoing disclosure may offer several advantages. First, use of the display 14, reflective polarizer 22 and aligned examples of the electro-optic element 26 allow for the production of a rearview mirror assembly 10 which may function as a conventional mirror (e.g., due to the reflection by the reflective polarizer 22) and an electronic display capable of showing a plurality of camera and computer generated images. Second, use of the aligned cathodic film 122, anodic film 134 and/or electro-optic film 154 may allow for the selective reduction of light emanating from the rearview mirror assembly 10. For example, light of the first polarization P1, emitted by the light source 44 and/or display 14 is allowed to pass through the reflective polarizer 22 and the electro-optic element 26 without being impeded, while light of the second polarization P2 (e.g., from ambient sources external to the rearview mirror assembly 10) may be absorbed by the electro-optic element 26 when in the darkened state. Selective reduction of the second polarization P2 may be advantageous in increasing a contrast of the display 14 to a viewer (i.e., because an image formed by the display 14 will not appear washed out by higher luminance ambient light of the second polarization P2). Third, use of the electro-optic element 26, as disclosed herein, allows for the rearview mirror assembly 10 to transition between electronic display and conventional mirror without the use of mechanical means such as a flipper or the use of an optical biasing prism which may impart a luxury or elegant feel to the rearview mirror assembly 10. Fourth, use of the multiple electrochromic polymer films and/or gels may allow, in the event of rearview mirror assembly 10 failure, the electro-optic element 26 to preferentially fail in a clear state such that the rearview mirror assembly 10 may still be utilized as a conventional mirror. Fifth, by polymerizing and synthesizing electrochromic polymer films in a pre-determined ordered state, fewer and less costly post-processing steps are required to implement the use of these functional materials.

Additional aspects of the present disclosure may include the following:

According to one aspect of the present disclosure, a vehicular rearview assembly is provided that includes a display configured to emit light of a first polarization. A reflective polarizer is positioned adjacent the display. The reflective polarizer is configured to transmit the light of the first polarization and reflect light of a second polarization and an electro-optic element is positioned on an opposite side of the reflective polarizer than the display. The electro-optic element is configured to transition between substantially clear and substantially darkened states. The electro-optic element includes an electrochromic polymer or network film substantially aligned with the second polarization of the light such that the electro-optic element is configured to substantially absorb the light of the second polarization when in the darkened state, while substantially transmitting light of the first polarization from the display.

According to another aspect of the present disclosure, a vehicular rearview assembly is provided that includes a display configured to emit light of a first polarization. A reflective polarizer is positioned adjacent the display. The reflective polarizer is configured to transmit the light of a first polarization and reflect light of a second polarization. An electro-optic element includes a first substantially transparent substrate defining first and second surfaces. The second surface includes a first electrically conductive layer. A second substantially transparent substrate defines third and fourth surfaces. The third surface includes a second electrically conductive layer. A primary seal is disposed between the first and second substrates. The seal and the first and second substrates define a cavity there between and an electrochromic polymer or network film is disposed within the cavity and includes a plurality of electrochromic moieties aligned with the light of the second polarization, the electrochromic polymer or network film being variably transmissive to the light of the second polarization such that the electro-optic element is operable between substantially clear and darkened states relative to the light of the second polarization, while substantially transmitting light of the first polarization.

According to yet another aspect of the present disclosure, a vehicular rearview assembly is provided that includes a display configured to transmit light of a first polarization. A reflective polarizer is positioned adjacent the display. The reflective polarizer is configured to transmit the light of a first polarization and reflect light of a second polarization. An electro-optic element includes a first substantially transparent substrate defining first and second surfaces. The second surface includes a first electrically conductive layer. A second substantially transparent substrate defines third and fourth surfaces. The third surface includes a second electrically conductive layer. A primary seal is disposed between the first and second substrates. The seal and the first and second substrates define a cavity there between. A first electrochromic polymer or network film is positioned within the cavity. The first electrochromic polymer or network film includes a plurality of cathodic electrochromics aligned with the second polarization of light and a second electrochromic polymer or network film in the cavity includes a plurality of anodic electrochromics aligned with the second polarization of light. The first and second electrochromic polymer or network films are variably transmissive to the light of the first polarization.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:
1. An optical assembly, comprising:
  a display configured to emit light of a first polarization;
  a reflective polarizer positioned adjacent the display, the reflective polarizer configured to transmit the light of the first polarization and reflect light of a second polarization; and
  an electro-optic element positioned on an opposite side of the reflective polarizer than the display, the electro-optic element configured to transition between substantially clear and substantially darkened states, wherein the electro-optic element comprises an electrochromic polymer or network film substantially aligned with the second polarization of the light such that the electro-optic element is configured to substantially absorb the light of the second polarization when in the darkened state and substantially transmit light of the first polarization from the display.
2. The optical assembly of claim 1, further comprising: a light source, wherein the light source is positioned on an opposite side of the display than the reflective polarizer.

3. The optical assembly of claim 1, wherein the reflective polarizer comprises at least one of a wire-grid or a polymer.

4. The optical assembly of claim 1, wherein the electrochromic polymer or network film comprises a cathodic di-acrylate viologen polymer, a cathodic di-acrylate viologen copolymer, a cathodic di-vinyl viologen polymer, a cathodic di-vinyl viologen copolymer, a cathodic di-vinyl ether viologen polymer, a cathodic di-vinyl ether viologen copolymer, a cathodic di-epoxy viologen polymer, a cathodic di-epoxy viologen copolymer, a cathodic di-oxetane viologen polymer, a cathodic di-oxetane viologen copolymer, a cathodic di-hydroxy viologen polymer, a cathodic di-hydroxy viologen copolymer, or a combination thereof.

5. The optical assembly of claim 1, wherein the electrochromic polymer or network film comprises a polymer made from a neutral cathodic 2,7-bis-(vinyl-ether)-benzo(lmn)(3,8)phenanthroline-1,3,6,8-tetraone, neutral cathodic 2,7-bis-(vinyl)-benzo(lmn)(3,8)phenanthroline-1,3,6,8-tetraone, neutral cathodic 2,7-bis-(acrylate)-benzo(lmn)(3,8)phenanthroline-1,3,6,8-tetraone, neutral cathodic 2,7-bis-(epoxy)-benzo(lmn)(3,8)phenanthroline-1,3,6,8-tetraone, neutral cathodic 2,7-bis-(oxetane)-benzo(lmn)(3,8)phenanthroline-1,3,6,8-tetraone, neutral cathodic 2,7-bis-(hydroxy)-benzo(lmn)(3,8)phenanthroline-1,3,6,8-tetraone, neutral cathodic 1,3,8,10-tetraone, 2,9-bis(vinyl ether)-anthra[2,1,9-def:6,5,10-d'e'f']diisoquinoline, neutral cathodic 1,3,8,10-tetraone, 2,9-bis(vinyl)-anthra[2,1,9-def:6,5,10-d'e'f']diisoquinoline, neutral cathodic 1,3,8,10-tetraone, 2,9-bis(acrylate)-anthra[2,1,9-def:6,5,10-d'e'f']diisoquinoline, neutral cathodic 1,3,8,10-tetraone, 2,9-bis(epoxy)-anthra[2,1,9-def:6,5,10-d'e'f']diisoquinoline, neutral cathodic 1,3,8,10-tetraone, 2,9-bis(oxetane)-anthra[2,1,9-def:6,5,10-d'e'f']diisoquinoline, neutral cathodic 1,3,6,10-tetraone, 2,9-bis(hydroxy)-anthra[2,1,9-def:6,5,10-d'e'f']diisoquinoline, or a combination thereof.

6. The optical assembly of claim 1, wherein the electrochromic polymer or network film comprises a polymer made from an anodic 5,10-di-(vinyl-ether)-5,10-dihydrophenazine, an anodic 5,10-di-(vinyl)-5,10-dihydrophenazine, an anodic 5,10-di-(acrylate)-5,10-dihydrophenazine, an anodic 5,10-di-(epoxy)-5,10-dihydrophenazine, an anodic 5,10-di-(oxetane)-5,10-dihydrophenazine, an anodic 5,10-di-(hydroxy)-5,10-dihydrophenazine, an anodic 5,10-dimethyl-5,10-dihydrophenazine-2,7-di-(vinyl ether), an anodic 5,10-dimethyl-5,10-dihydrophenazine-2,7-di-(vinyl), an anodic 5,10-dimethyl-5,10-dihydrophenazine-2,7-di-(acrylate), an anodic 5,10-dimethyl-5,10-dihydrophenazine-2,7-di-(epoxy), an anodic 5,10-dimethyl-5,10-dihydrophenazine-2,7-di-(oxetane), an anodic 5,10-dimethyl-5,10-dihydrophenazine-2,7-di-(hydroxy), an anodic 7,14-dimethyl-7,14-dihydrobenzo[5,6][1,4]thiazino[2,3-b]phenothiazine-3,10-di-(vinyl ether), an anodic 7,14-dimethyl-7,14-dihydrobenzo[5,6][1,4]thiazino[2,3-b]phenothiazine-3,10-di-(vinyl), an anodic 7,14-dimethyl-7,14-dihydrobenzo[5,6][1,4]thiazino[2,3-b]phenothiazine-3,10-di-(acrylate), an anodic 7,14-dimethyl-7,14-dihydrobenzo[5,6][1,4]thiazino[2,3-b]phenothiazine-3,10-di-(epoxy), an anodic 7,14-dimethyl-7,14-dihydrobenzo[5,6][1,4]thiazino[2,3-b]phenothiazine-3,10-di-(oxetane), an anodic 7,14-dimethyl-7,14-dihydrobenzo[5,6][1,4]thiazino[2,3-b]phenothiazine-3,10-di-(hydroxy), or a combination thereof.

7. The optical assembly of claim 1, wherein the electrochromic polymer or network film comprises a nematic imidazolium liquid crystal, a nematic viologen liquid crystal, or a combination thereof.

8. A method of forming a polarized electro-optic element, comprising the steps of:
- aligning an electrochromic monomer and a liquid crystal component;
- polymerizing at least the electrochromic monomer to synthesize an electrochromic polymer or network film;
- removing the liquid crystal component that is unbound to the electrochromic polymer or network film;
- positioning the electrochromic polymer or network film on a conductive layer of the electro-optic element; and
- adding an electrolyte to the electrochromic polymer or network film; and
- wherein the electrochromic monomer is aligned with light of a predetermined polarization, and wherein the electrochromic polymer or network film is variably transmissive to the light of the predetermined polarization such that the electro-optic element is operable between a substantially clear state and a darkened state relative to the light of the predetermined polarization.

9. The method of claim 8, wherein the polymerizing further comprises combining a photoinitiator with the electrochromic monomer.

10. The method of claim 8, wherein the polymerizing further comprises polymerizing the liquid crystal component.

* * * * *